March 6, 1945.    R. V. LANGMUIR    2,370,673
MASS SPECTROMETRY
Filed Sept. 11, 1939
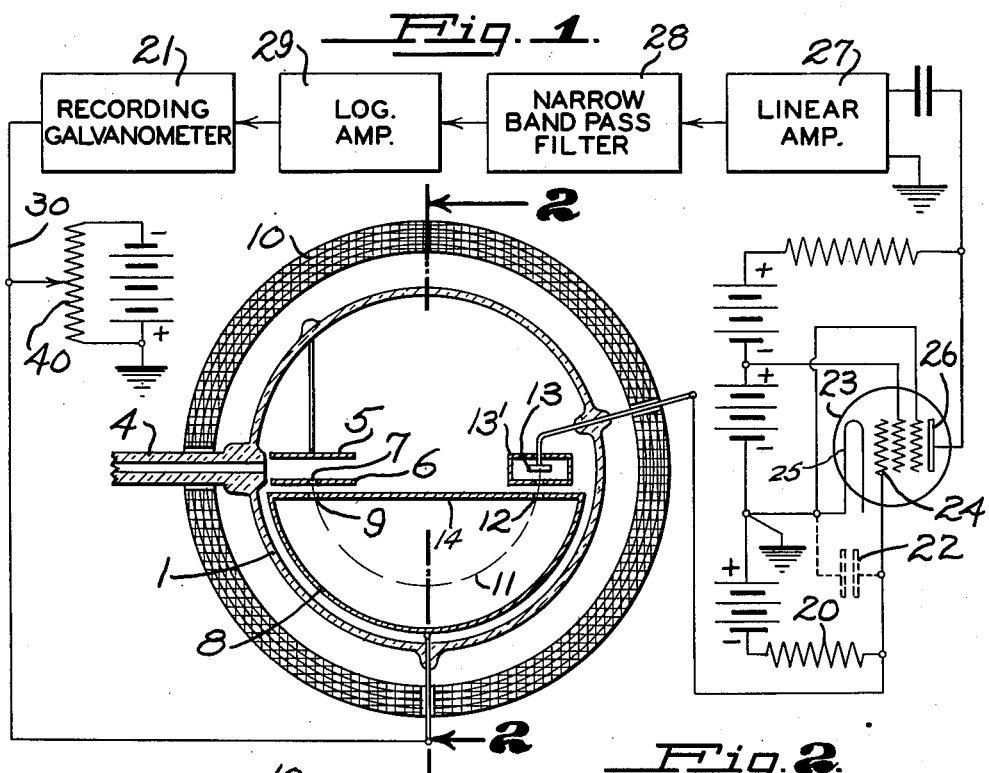
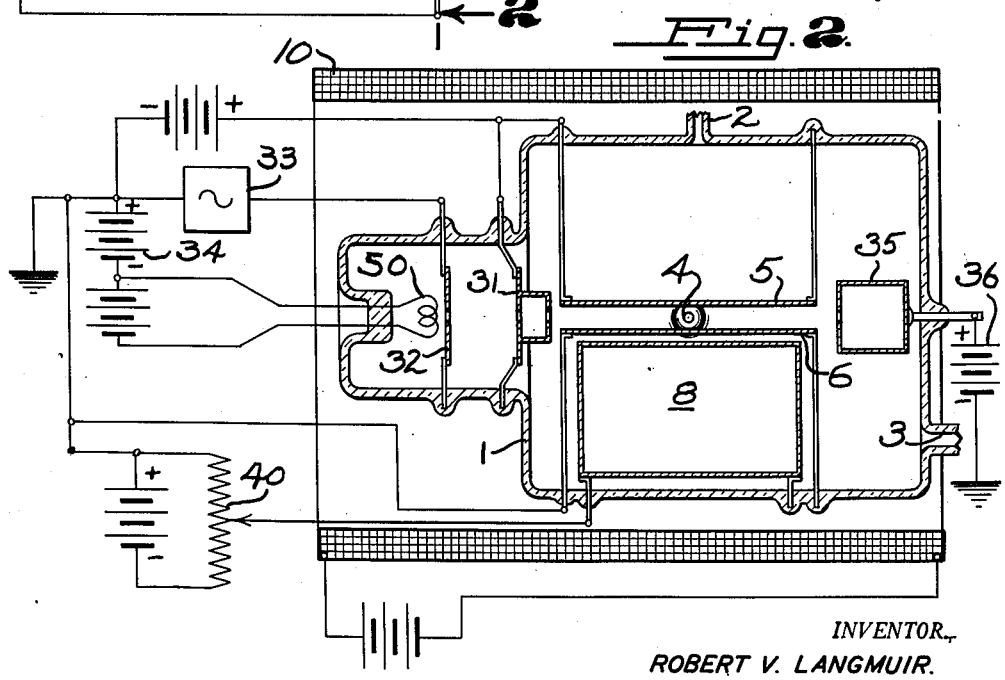
INVENTOR.
ROBERT V. LANGMUIR.
BY Lippincott & Metcalf
ATTORNEYS.

Patented Mar. 6, 1945

2,370,673

UNITED STATES PATENT OFFICE 2,370,673

MASS SPECTROMETRY

Robert V. Langmuir, Pasadena, Calif., assignor, by mesne assignments, to Consolidated Engineering Corporation, Pasadena, Calif., a corporation of California Application September 11, 1939, Serial No. 294,346

26 Claims. (Cl. 73—18)

The present invention relates to mass spectrometry, and particularly provides a method and means for detecting and recording the relative concentrations of ions derived from a sample of gas or vapor.

Special advantages of my invention lie in the increased recording speed provided. By virtue of the higher recording speeds attainable with my invention, it is especially adapted for use in the analysis of soil gas samples for petroleum prospecting, as such soil gas samples are usually small and must be analyzed rapidly in order to take full advantage of the amounts available. High speed recording also makes possible the handling of a large number of samples per unit of time.

In a mass spectrometer a gas sample to be analyzed is bombarded by moving electrons. The ions resulting from this bombardment are usually subjected to the influences of electric and magnetic fields and separated into various space components dependent on the mass-to-charge ratio. In this manner it is possible to study the products of ionization of a particular gas, and, by using appropriate calibrations, analyze an unknown gas to determine the relative concentrations of its components. In detecting and measuring the ionic component existing in the exit field of a mass spectrometer, positive ions of a given mass-to-charge ratio may be directed upon an ion collector and the intensity of the corresponding ion current measured by means of a direct current amplifier. By varying an analyzing electric or magnetic field or moving the collector in the exit field, various types of ions are caused to fall upon the collector successively and the respective intensities measured.

The use of such a method and apparatus in soil gas analysis is subject to certain inherent difficulties chiefly arising out of the limitation of D. C. amplifiers used with mass spectrometers and the small samples of gas available for analysis.

Among the objects of my invention are: To make possible the use of an alternating current amplifier in mass spectrometry and thereby overcome the limitations of prior apparatus; to provide a method and apparatus for detecting small amounts of petroleum indicators in soil or gas samples obtained from spaced points; to provide a method and means for producing variations in the intensity of an ion current occurring in a mass spectrometer; to provide a rapid recording mass spectrograph; to provide a means and method for reducing the effect of noise relative to ion currents of a mass spectrometer.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing:

Fig. 1 is a cross-section of the mass spectrometer illustrating one embodiment of my invention, with a schematic diagram of an amplifier, recorder, and analyzing potential source.

Fig. 2 represents a longitudinal view, partly in section, taken on the line 2—2 in Fig. 1.

Broadly, according to my invention, an ion beam, the intensity of which is varied in a predetermined manner, is generated in a mass spectrometer and the variable ion beam directed against a collector whose oscillatory potential is then amplified and recorded. In the preferred form of my invention I generate an ion beam the intensity of which varies in a sinusoidal manner at a frequency which is preferably smaller than the number of ions falling on the collector per second.

By causing various ionic components of the sample to fall successively on the collector and moving the recording medium past the recording point in a related manner, I provide substantially continuous recording of a mass spectrum.

Referring to the figures, an envelope 1 is maintained at low pressure by means of vacuum pumps (not shown) connected to vacuum lines 2, 3. A sample of gas to be analyzed is admitted at low pressure to envelope 1 through capillary 4. As the gas sample flows through the space between plates 5 and 6 it is bombarded by a unidirectional electron stream the strength of which varies in a pulsating manner, thereby resulting in the formation of a variable amount of gaseous ions in said space between plates 5 and 6.

By establishing a small negative voltage on plate 6 relative to the voltage on plate 5, the positive gaseous ions formed are drawn toward plate 6 and some are drawn through slit 7 where a high accelerating potential between plate 6 and the semicylindrical case 8 causes the ions to acquire high velocity. The potential between plate 6 and case 8 provides an electric accelerating field which causes positive ions passing through the slit 7 to be highly accelerated toward the case 8. Some of the high velocity ions enter case 8 through the slit 9 and thereupon follow curved paths due to the effects of the magnetic field supplied by solenoid 10. Due to the combined action of the aforementioned electric accelerating field and the magnetic field, the ions entering the case 8 are separated into ionic beams of different mass-to-charge ratios. Each beam follows a semi-circular path, the radius of which is determined by the strengths of the electric accelerating field, the magnetic field, and the mass-to-charge ratio. Each beam of ions appears to originate from a source at slit 9 and is brought to a focus at a different point in the plain plate 14 of semicylindrical case 8.

Ions having a predetermined mass-to-charge ratio, depending on the strength of the accelerating potential between plate 6 and case 8 and the magnetic field supplied by solenoid 10, follow a substantially semi-circular path 11, pass through slit 12 and fall upon ion collector 13 insulated from grounded shield 13'. Here the ions discharge and produce a pulsating electric current through resistor 20 corresponding in frequency and intensity to the collected ion current.

The corresponding voltage appearing across resistor 20 is amplified in a manner discussed below and the intensity of the ion beam registered by recording galvanometer 21. The mass of the ions contained within the ion beam passing through slit 12 into the collector 13 is changed by varying the intensity of the accelerating electric field between plate 6 and case 8 by movement of the slide of potentiometer 40. Thus separate beams existing within the case 8 may be successively brought to a focus at the slit 12, where the intensities of the respective ion beams are successively measured.

Referring more particularly to Fig. 2, I have shown one embodiment of my invention which provides for varying the ion current in a pulsating manner.

Within envelope 1 the ionizing source of electrons is represented by filament 50, anode structure 31 and a control electrode 32 with the usual associated batteries. Electrode 32 and anode 31 are preferably maintained at positive potentials with respect to filament 50. The potential of electrode 32 is varied by means of an alternating potential from voltage generator 33 so as to control the intensity of the electron beam originating at filament 50 and streaming through apertures in the electrode 32 and anode structure 31 and entering the space between plates 5 and 6 where the electrons bombard and ionize gas from capillary tube 4. Those electrons which pass all the way between plates 5 and 6 are picked up by electron collector 35 and flow to ground through battery 36.

Though a variable voltage on control electrode 32 varies the intensity of the electron beam, the velocity of the electrons bombarding the gas sample is substantially constant and is determined by the potential difference between filament 50 and anode 31. If the voltage of battery 34 exceeds the amplitude of a sinusoidal voltage supplied by generator 33, the electron beam will vary in intensity but will never be shut off completely.

Obviously the concentration of ions in the space between plates 5 and 6 will be substantially proportional to the intensity of the electron beam.

Though the frequency of electron beam modulation is preferably made smaller than the average number of ions falling on collector 13 per second, so that the intensity of said ion current varies in an easily controllable manner, nevertheless it is to be understood that a higher modulation frequency may be used and some of the advantages of my invention retained.

To produce the variable ion beam I prefer to use a sinusoidal pulsating electron beam so that I can obtain substantially sinusoidally pulsating ion currents in the output of the mass spectrometer and thus facilitate amplification.

The alternating portion of signal voltages appearing between grid 24 and cathode 25 due to a sinusoidal pulsating ion current is then given by $$e_s = \frac{R}{1+j\omega RC} i \quad (1)$$

where $i$ is the alternating portion of the ion current falling on collector 13 and C is the input capacitance 22 of tube 23. The corresponding output voltage appearing in the anode 26 circuit is further amplified by amplifier 27, passed through a narrow band pass filter 28, amplified further by amplifier 29, and impressed on the recording galvanometer 21.

For reasons pointed out below the band pass filter 28 is preferably designed to pass a very narrow band of frequencies in the region of $$f = \frac{\omega}{2\pi}$$

For this purpose a resonant circuit having a very high Q may be used, such as may be obtained from a resonant circuit utilizing electromechanical units such as magneto-striction oscillators or tuning forks as elements thereof. By utilizing a sharp resonate circuit, or a narrow band pass filter, I am able to increase the signal-to-noise ratio and consequently detect smaller ion currents than would otherwise be possible.

Due to thermal agitation within resistor 20, noise will be impressed on grid 24 and amplified by the system. If only a small range of frequencies is passed by filter 28 the magnitude of the input noise is given by $$E_N = \sqrt{\frac{4KTR}{1+4\pi^2 R^2 C^2 f^2} df} \text{ approx.} \quad (2)$$

where T is temperature in degrees Kelvin, K is Boltzman's gas constant, and df is the effective band width of filter 28.

Hence the signal to noise ratio in the output is $$\frac{E_s}{E_N} = 0.8 \cdot 10^{10} \sqrt{\frac{R}{df}} i$$

Inasmuch as the current $i$ to be measured may be as low as $10^{-17}$ ampere, I prefer to utilize as large a resistance 20 as possible, of the order of $10^{10}$ or $10^{14}$ ohms, and a narrow band pass filter 28, and in this manner achieve high ultimate sensitivity and provide high signal-to-noise ratio.

Following the filter 28 I prefer to utilize an amplifier, the output of which is proportional to the logarithm of the input, thus making possible the recording of a wide range of ion intensities on a recording medium of limited width. Logarithmic amplifiers suitable for this purpose are well known to those skilled in the art.

In the form of my invention illustrated I utilize a common control connection 30 to coordinate the movement of the recording medium within recorder 21 with the magnitude of the accelerating, or analyzing, electric field provided between plate 6 and case 8 by potentiometer 40. In this manner I am able to produce a continuous record in which one coordinate indicates the mass-to-charge ratio and the other coordinate measures intensity of ion current.

It is to be understood that the recording speed necessary to attain a predetermined resolving power varies as an inverse function of the width (*df*) of the band passed by filter 28. By resolving power I mean the ability to differentiate and accurately measure the relative intensity of neighboring peaks on the final record obtained.

It is clear that the ultimate sensitivity, resolving power, and recording speed are interrelated with the characteristics of the filter 28. In the preferred form of my invention the recording speed is made as rapid as possible without causing undue loss of sensitivity or resolving power.

While I have described the application of my invention in reference to one specific type of mass spectrometer, one specific method of modulating the ion beam, and one particular method of coordinating the recording medium and the charge-to-mass ratio of the ion beam being analyzed, it is to be understood that I do not wish to be limited by these specific embodiments of my invention but only by the scope of the appended claims.

In the claims the term "gas" includes vapors and all other substances composed of discrete particles of molecular dimension.

I claim:

1. The method of mass spectrometry which comprises the steps of bombarding a gas sample with a pulsating electron beam to produce a pulsating ion beam, causing ions of said beam having a predetermined mass-to-charge ratio to impinge an ion collector, and measuring the pulsating charge appearing on said ion collector.

2. The method of mass spectrometry which comprises the steps of bombarding a gas sample with a pulsating electron beam, and measuring the degree of pulsation of the amount of various ions produced by said bombardment.

3. In a method of mass spectrometry the improvement which comprises ionizing a gas sample in a regularly pulsating manner, electromagnetically separating the ions produced into a plurality of ionic beams in accordance with the mass-to-charge ratio of said ions, causing each of the respective pulsating ion beams to successively modulate the voltage of an ion collector, and measuring the amplitude of modulation of the voltage of said collector caused by the pulsation of each of said ion beams.

4. A method according to claim 3, in which the modulation occurs at a predetermined frequency and a recording is made of the variable collector voltage at the frequency of modulation.

5. A method according to claim 3, in which the amplitude of the collector voltage modulation is recorded synchronously with the variation of mass-to-charge ratio of different ions affecting said collector.

6. A mass spectrometer comprising an envelope, an inlet port for the admission of a gas sample to said envelope, means for maintaining low pressure within said envelope, ionizing means for ionizing said gas sample in a pulsating manner, means for segregating ions of various mass-to-charge ratios derived from said gas sample, and means for measuring the amplitude of pulsation of the varying concentration of said ions having a predetermined mass-to-charge ratio.

7. Apparatus according to claim 6, including means adapted to vary the degree of ionization of said gas substantially sinusoidally and at a predetermined frequency, and means for rendering the measuring means especially sensitive to signals of said frequency.

8. Apparatus according to claim 6, in which said ionizing means comprises an electron stream arranged to bombard a gas sample admitted to said envelope and means to modulate said electron stream.

9. Apparatus according to claim 6, in which said ionizing means comprises an electron stream arranged to bombard a gas sample admitted to said envelope, means to modulate said electron stream at a predetermined frequency, and wherein said measuring means is especially sensitive to signals of said frequency.

10. In a mass spectrometer having a source of ions of different mass-to-charge ratios, a collector, a circuit connected thereto, means for successively affecting the collector with beams comprising ions of different corresponding mass-to-charge ratios, means arranged to pulsate the intensity of each beam while it affects the collector, whereby the collector produces in said circuit a series of electrical currents corresponding in amplitude with the pulsations in the intensities of the respective beams, and a recorder connected to said collector for successively recording indications corresponding to said currents, the improvement comprising means connected between said collector and said recorder converting said currents into indications proportional to the logarithm of the amplitude of said alternating currents.

11. In a mass spectrometer, an ion current source providing a unidirectionally flowing ion current varying in intensity at a predetermined frequency, an ion current translating circuit having an input and an output, means responsive to said ion current connected to said input, and filter means in said circuit adapted to transmit to said output only electric currents lying in a narrow band of frequencies including said predetermined frequency.

12. In a mass spectrometer, means for generating a heterogeneous ion beam the intensity of which varies at a predetermined frequency, means for electromagnetically separating said heterogeneous ion beam into a plurality of ionic component beams in accordance with the mass-to-charge ratio of ions present in the heterogeneous beam, and means for indicating the amplitude of the intensity variation of one of said ionic component beams.

13. In a mass spectrometer, means for generating a heterogeneous ion beam the intensity of which varies at a predetermined frequency, means for separating from said heterogeneous beam a component beam comprising ions of a predetermined mass-to-charge ratio and varying in intensity at a corresponding frequency, means for detecting electrical charges from ions of said mass-to-charge ratio, said detecting means being responsive to a variation in intensity of the component thereby producing an alternating electrical current corresponding in frequency and amplitude to the varying rate of charge collection, and means for indicating the amount of the alternating electrical current.

14. Apparatus according to claim 13 including means for transmitting from said detecting means to said indicating means only components of alternating currents present in a narrow frequency band including said corresponding frequency.

15. Apparatus according to claim 13 including means intermediate said detector means and said indicating means for amplifying the electrical currents substantially logarithmically.

16. In a mass spectrometer, an evacuated envelope, an inlet port for admission of a gas sample to said envelope, means within said envelope for ionizing the admitted portion of said gas sample, means for collecting charges carried by resultant ions of a predetermined mass-to-charge ratio, means acting on the ions for varying the rate of ion collection in a regularly pulsating manner, the rate of collection of ions of said predetermined mass-to-charge ratio varying in a corresponding pulsating manner, and means for indicating the amplitude of pulsation of the rate of ion collection.

17. Apparatus according to claim 16 wherein said means for varying the rate of ion collection includes means for varying said rate in a substantially sinusoidal manner at a predetermined frequency, and a filter for rendering said indicating means especially sensitive to a collection rate at said frequency.

18. In a mass spectrometer, means for generating a beam of ions which pulsates in intensity at a predetermined frequency, and means for detecting and indicating the extent of such periodic variation in intensity, said latter means including a filter that selects intensity variations at said frequency.

19. In a mass spectrometer having an ionization chamber and an ion detector, means for causing a periodically pulsating flow of ions of a single mass-to-charge ratio from the chamber to the detector, and means for indicating the amplitude of pulsation.

20. In a mass spectrometer, means for generating pulsating ion beams comprising ions of different mass-to-charge ratios and for producing alternating currents corresponding to the respective beams, a recorder coordinated with said means and adapted to successively record indications corresponding to said alternating current, and a logarithmic alternating current amplifier connected intermediate said means and said recorder for converting said alternating currents into recordable indications proportional to the logarithms of the respective electric currents.

21. In a mass spectrometer including means for pulsatingly ionizing a material, means for detecting resulting ions of predetermined mass-to-charge ratio and for producing an electric current that pulsates in an amount corresponding to the amount of such material subjected to ionization, and means for converting said pulsating current into another electrical current which bears a relatively high ratio to the amplitude of such pulsating current when said pulsating current is small and a relatively low ratio thereto when said pulsating current is large.

22. In a mass spectrometer, means for pulsatingly converting a material into ions, means for detecting resulting ions of predetermined mass-to-charge ratio and for producing an alternating current that pulsates in an amount corresponding to the amount of such material subjected to ionization, and means for converting said alternating current into another electrical current which bears a relatively high ratio to the amplitude of such alternating current when such alternating current is small and into another electrical current which bears a relatively low ratio to the amplitude of said alternating current when said alternating current is large.

23. In a mass spectrometer, means for pulsatingly converting a material into ions, means for detecting ions of a predetermined mass-to-charge ratio, an electrical circuit connected to the detecting means, whereby an ion current corresponding in intensity to the amount of such material converted into ions is produced in the circuit, and means including a non-linear ion current translating device connected to the circuit for converting the ion currents into corresponding indications which bear a large ratio to weak ion currents and a small ratio to strong ion currents, and means for detecting said indications.

24. In a mass spectrometer, means for pulsatingly converting a material into ions, means for detecting ions of a predetermined mass-to-charge ratio, an electrical circuit connected to the detecting means, whereby an ion current corresponding in intensity to the amount of such material converted into ions is produced in the circuit, and means connected to the circuit for converting weak ion currents into corresponding indications which bear a large ratio thereto and strong ion currents into corresponding indications bearing a small ratio thereto, and means for detecting said indications.

25. In a method of mass spectrometry, the steps which comprise causing a gas sample to be ionized in a regularly pulsating manner, separating the ions thus produced into a plurality of ion beams in accordance with the mass-to-charge ratios of the ions present, and measuring the amplitude of pulsation of each beam.

26. In a mass spectrometer the combination which comprises means for generating an ion beam of pulsating intensity, means operatively associated with the ion beam generating means for producing an electrical current, the intensity of which pulsates to correspond with the intensity of the ion beam, and means for indicating the degree of pulsation of the intensity of the electrical current.

ROBERT V. LANGMUIR.